(12) United States Patent
Lin

(10) Patent No.: US 6,295,279 B1
(45) Date of Patent: Sep. 25, 2001

(54) SYSTEM AND METHOD FOR MEASURING REVERSE-LINK CARRIER-TO-INTERFERENCE RATIO FOR A TIME DIVISION MULTIPLE ACCESS SYSTEM IN THE FIELD ENVIRONMENT

(75) Inventor: Zongde Lin, Dallas, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/145,713

(22) Filed: Sep. 2, 1998

(51) Int. Cl.[7] ............................. H04B 7/212; G01R 31/08
(52) U.S. Cl. ..................... 370/252; 370/337; 370/332; 370/347; 455/67.1; 455/115; 455/423
(58) Field of Search ..................................... 390/246, 333, 390/337; 455/67.1, 115, 63, 423; 370/242, 243, 332, 347

(56) References Cited

U.S. PATENT DOCUMENTS 5,533,055 * 7/1996 Matzek ................................. 375/286
5,799,243 * 8/1998 Ojaniemi ............................... 455/63
5,898,928 * 4/1999 Karlsson et al. ...................... 455/450
6,006,092 * 12/1999 Ward ..................................... 455/438

* cited by examiner

*Primary Examiner*—Hassan Kizou
*Assistant Examiner*—Thien Tran
(74) *Attorney, Agent, or Firm*—Jenkens & Gilchrist, P.C.

(57) ABSTRACT

A telecommunications system and method is disclosed for obtaining an accurate reverse-link Carrier-to-Interference (C/I) measurement for a Time Division Multiple Access (TDMA)-based system in a field environment. The field measurement is performed by using one time slot (voice channel) of one TDMA carrier for recording the carrier signal strength while two other time slots (two idle voice channels) are used in recording the co-channel or adjacent channel interference in a pseudo real time basis. Either the maximum interference or the average interference on the two additional time slots can be used to determine the C/I performance. Alternatively, only one additional time slot can be used to measure the interference. For example, if one of the additional time slots is busy, the interference can be measured on the other one of the additional time slots.

20 Claims, 4 Drawing Sheets

Interference Distribution for Three TSs on the idle Voice Channel

MDVC-736 TS2

MDVC-737 TS1

MDVC-736 TS0

SYSTEM AND METHOD FOR MEASURING REVERSE-LINK CARRIER-TO-INTERFERENCE RATIO FOR A TIME DIVISION MULTIPLE ACCESS SYSTEM IN THE FIELD ENVIRONMENT

BACKGROUND OF THE PRESENT INVENTION

1. Field of the Invention

The present invention relates generally to telecommunications systems and methods for measuring the carrier to interference ratio in a time division multiple access cellular network, and specifically to providing an accurate field measurement of the carrier to interference ratio on the reverse-link.

2. Background and Objects of the Present Invention

Mobile communications, especially cellular radio, is one of the fastest growing and most demanding telecommunications applications ever. Today it accommodates a large and continuously increasing percentage of all new telephone subscriptions around the world with the increasing service requirements. Cellular networks have evolved into two different networks within Time Division Multiple Access (TDMA) technology. The European cellular network uses the Global System for Mobile Communication (GSM) standard as the digital cellular system. In the United States, cellular networks have traditionally been primarily analog, but recent advances have been incorporating digital systems within the analog networks. One such North American cellular network is the D-AMPS network, which is described hereinbelow.

With reference now to FIG. 1 of the drawings, there is illustrated a D-AMPS Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18.

Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MSC 14 is in communication with a Base Station (BS) 24. The BS 24 is the physical equipment, illustrated for simplicity as a radio tower, that provides radio coverage to the geographical part of the cell 22 for which it is responsible.

With further reference to FIG. 1, the PLMN Service Area or cellular network 10 includes a Home Location Register (HLR) 26, which is a database maintaining all subscriber information, e.g., user profiles, current location information, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The radio interface between the BS 24 and the MS 20 utilizes Time Division Multiple Access (TDMA) to transmit information between the BS 24 and the MS 20, with one TDMA frame per carrier frequency. Each frame consists of six timeslots or physical channels. Depending upon the kind of information sent, different types of logical channels can be mapped onto the physical channels. For example, speech is sent on the logical channel, "Traffic Channel" (TCH), and signaling information is sent on the logical channel, "Control Channel" (CCH).

Currently, speech and data are transmitted from the BS 24 to the MS 20 on a forward-link channel 30 and from the MS 20 to the BS 24 on a reverse-link channel 32. Interference on either the forward-link or reverse-link channel can significantly reduce the quality of the signal transmitted on these channels. At present, there are two types of interference: co-channel interference and adjacent channel interference. Co-channel interference is the interference caused by the usage of the same frequency within two different clusters (not shown) of cells 22. Adjacent channel interference is caused by the usage of adjacent frequencies between adjacent cells 22 within the same cluster or within two different clusters.

The carrier-to-interference (co-channel or adjacent-channel) (C/I) ratio is one of the most important radio network performance criteria in evaluating a wireless communication system, including, but not limited to the GSM network, the new Personal Communications System (PCS) network, the D-AMPS network, and the AMPS network. In order to reduce interference within the cellular system 10, both co-channel and adjacent channel interference must be minimized. Therefore, by increasing the ratio, e.g., by reducing the interference with respect to the carrier (level) of the desired signal, the co-channel or adjacent channel interference can be reduced and the signal quality received by MSs 20 within the cell 22 can be improved.

The EIA/TIA IS-136 standards specify the minimum performance requirements of the carrier-to-co-channel interference and the carrier-to-adjacent channel interference for a BS 24. In order for vendors to ensure that their products meet C/I minimum performance requirements, the reverse-link C/I performance must be measured. These C/I field performance measurements are used by many operators as one of the criteria in comparing different vendors' products and evaluating the quality of purchased products. Furthermore, an accurate field knowledge of the C/I performance for the system is important for designing a cellular network and optimizing an existing network. However, at present, there is no accurate technique of C/I field measurement available.

It is, therefore, an object of the present invention to provide a system and method for obtaining an accurate Carrier-to-Interference field measurement.

SUMMARY OF THE INVENTION

The present invention is directed to telecommunications systems and methods for obtaining an accurate reverse-link C/I measurement for a Time Division Multiple Access (TDMA)-based system in a field environment. The field measurement is performed by using one time slot (voice channel) of one TDMA carrier for recording the carrier signal strength while two other time slots (two idle voice channels) are used in recording the co-channel or adjacent channel interference in a pseudo real time basis. Either the maximum interference or the average interference on the two additional time slots can be used to determine the C/I performance. Alternatively, one additional time slot can be used to measure the interference if the other additional time slot is in conversation. Advantageously, the system and method of the present invention can be applied to any TDMA-based system deployed for outdoor or indoor applications without any major modifications. In addition, this system and method can also be applied to reverse-link C/I lab measurement without major modifications. Furthermore, the system and method of the present invention provides a performance C/I measurement for the cellular network at a system level instead of at a component level (Base Station).

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
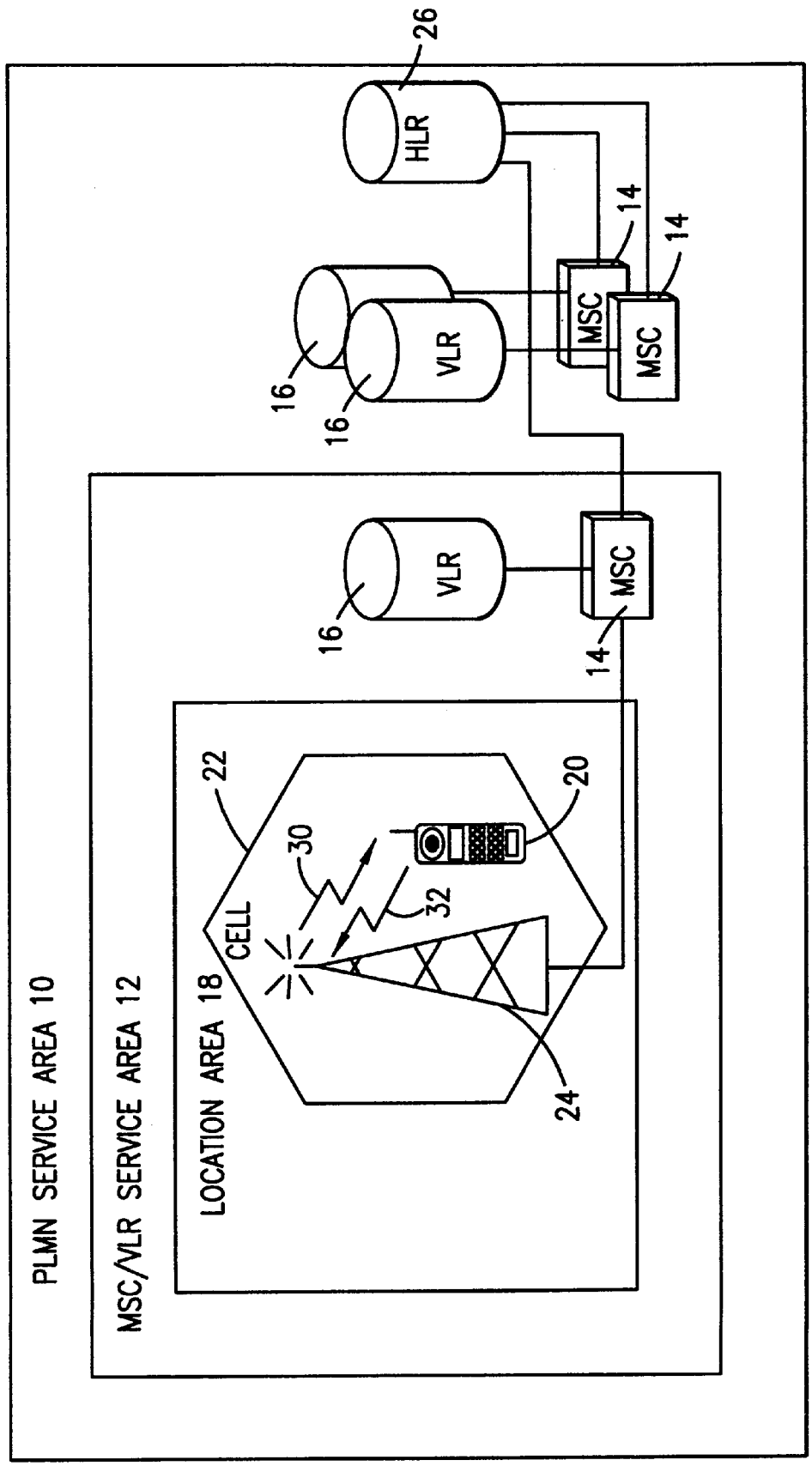
FIG. 1 is a block diagram of a conventional wireless telecommunications system.
Figure 2:
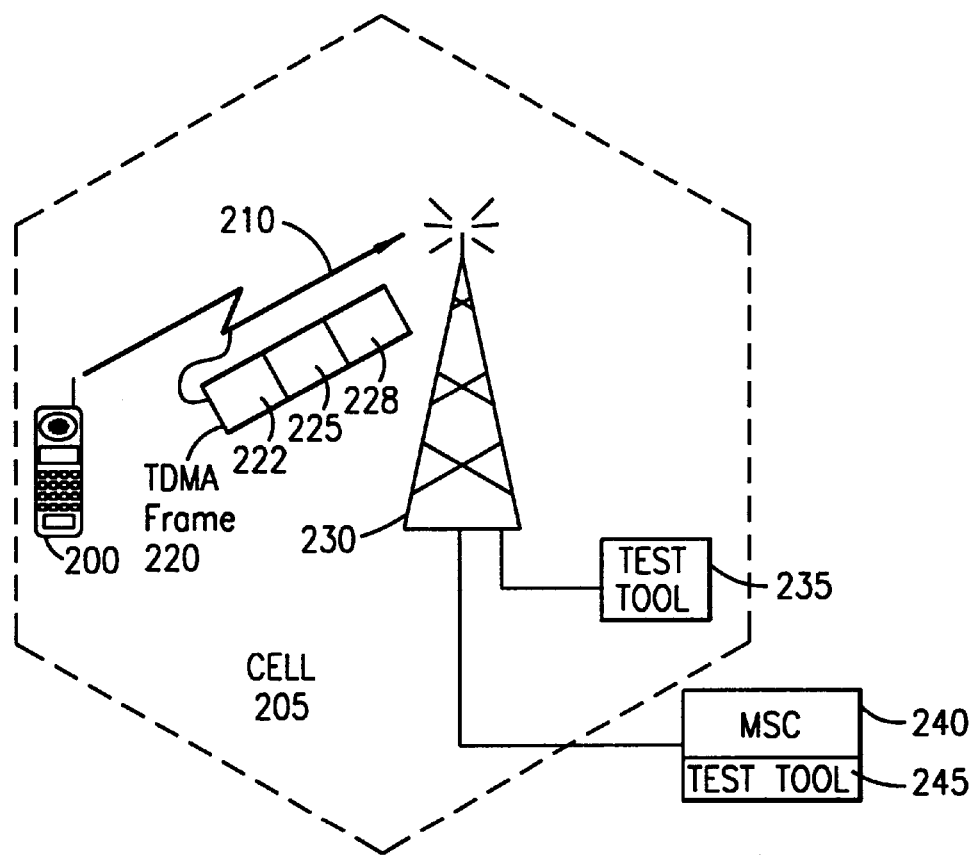
FIG. 2 is a block diagram illustrating a reverse-link Carrier-to-Interference (C/I) measurement system in accordance with preferred embodiments of the present invention.

With reference now to FIG. 2 of the drawings, an accurate measurement in a field environment for the Carrier-to-Interference (C/I) ratio on a reverse-link 210, e.g., the channel between a Mobile Station (MS) 200 and a Base Station (BS) 230 serving an area (cell 205) that the MS 200 is located in, is becoming an important design criteria in a cellular network. An accurate field C/I measurement can be obtained according to embodiments of the present invention by utilizing one time slot (voice channel) 222 of a Time Division Multiple Access (TDMA) frame of a carrier (frequency) for recording the carrier signal strength (C) on the reverse-link 210 and two additional time slots (two idle voice channels) 225 and 228 for recording the co-channel or adjacent channel interference (I) on the reverse-link 210 on a pseudo real time basis. Either the maximum interference or the average interference on the two additional time slots 225 and 228 can be used to determine the C/I performance. Alternatively, only one additional time slot 225 can be used to measure the interference. For example, if time slot 228 is busy, the interference can be measured only on time slot 225. It should be understood that any one or combination of two of the three time slots 222, 225 and 228 can be utilized for measuring the co-channel and adjacent channel interference on the reverse-link 210.

In preferred embodiments, the recordation of the interference can be performed using a test tool 235 connected with or integrated with the BS 230, while the carrier signal strength recordation can be performed utilizing an additional test tool 245 located within a Mobile Switching Center (MSC) 240 connected to the serving BS 230. In this case, the test tool 235 has to be synchronized in time with the additional test tool 245. Alternatively, it should be noted that the recordation of the carrier signal strength and interference can be performed by the same test tool 235 or 245, which can be located within or connected to either the serving BS 230 or the MSC 240.

Figure 3:
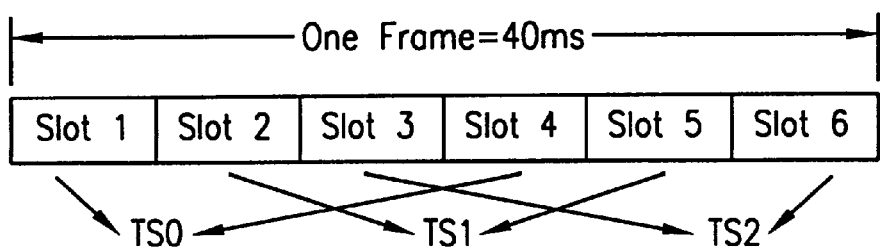
FIG. 3 shows an IS-136 Time Division Multiple Access (TDMA) Frame Structure having six half-rate time slots in which two of such half-rate time slots correspond to one full-rate time slot.

As an example, as shown in FIG. 3, in an IS-136 TDMA frame structure in which one frame is 40 milliseconds (ms), one full-rate time slot TS0 occupies two half-rate time slots Slot 1 and Slot 4. Therefore, during a conversation on TS0, the carrier level can be measured in Slot 1 and Slot 4, while the co-channel and adjacent channel interference can be measured in the idle half-rate time slots Slots 2 and 5 and Slots 3 and 6 of the additional full-rate time slots TS1 and TS2, respectively.

Figure 4:
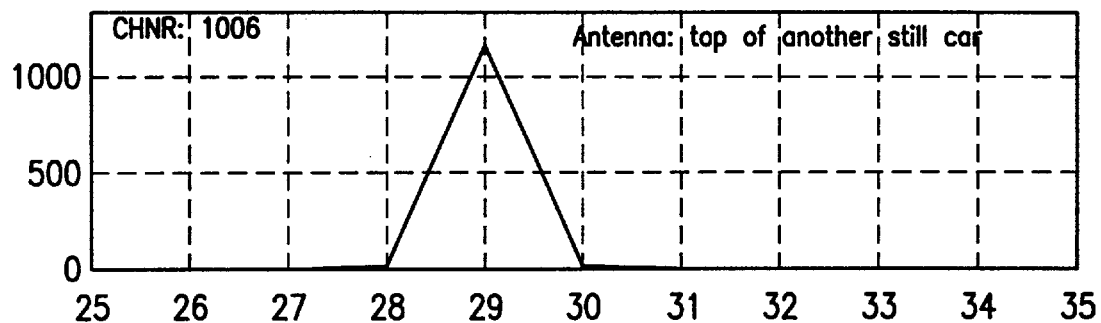
FIG. 4 demonstrates field measurement results for interference distributions on three time slots for a source placed in a stationary Rician environment.
Figure 4:
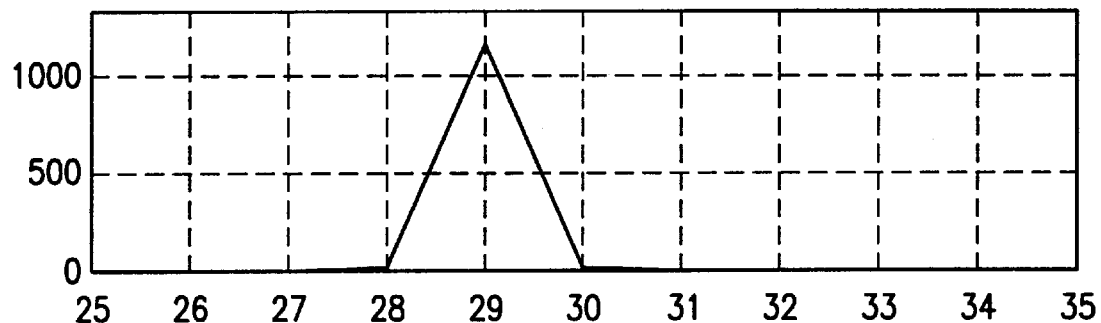
Figure 4:
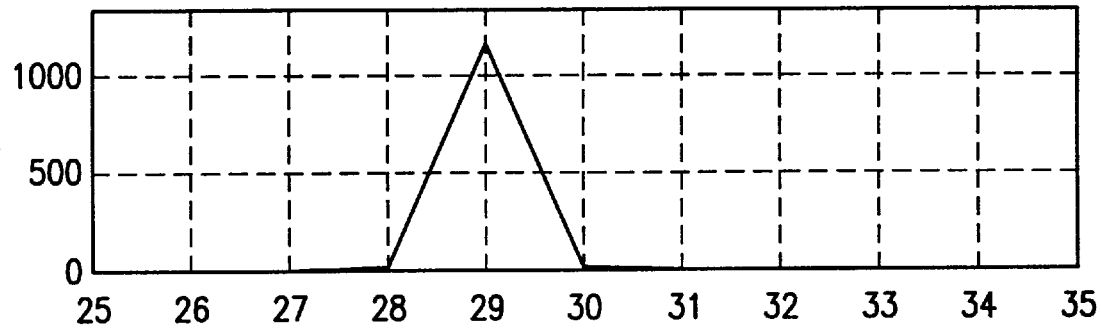
Figure 5:
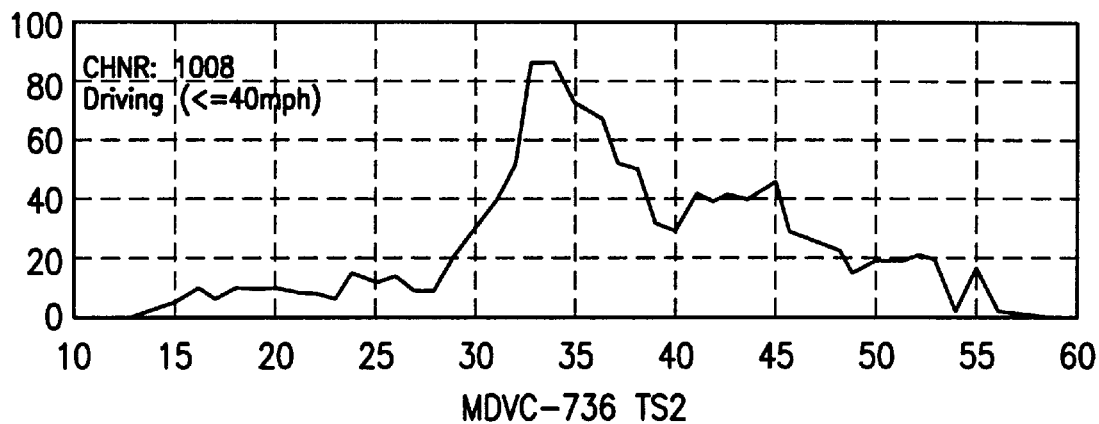
FIG. 5 demonstrates field measurement results for interference distributions on three time slots for a moving source in a Rayleigh environment (<=40 mph).
Figure 5:
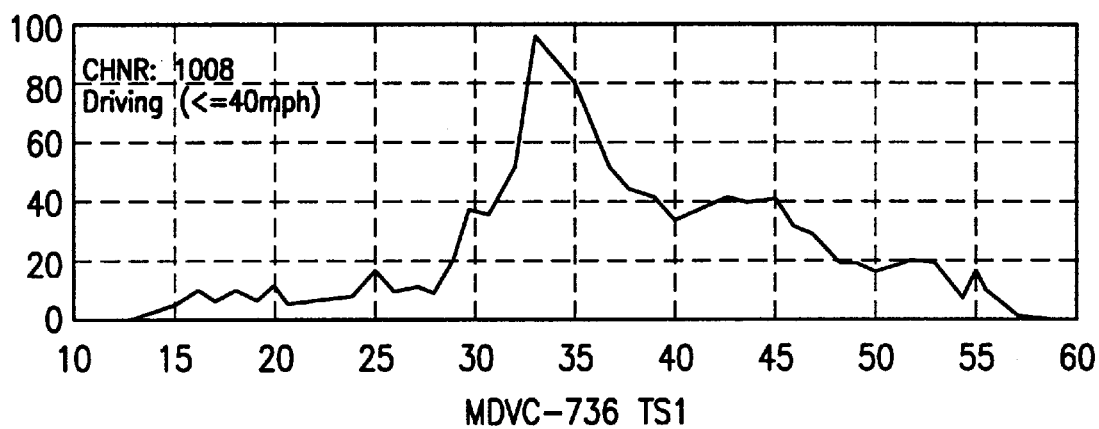
Figure 5:
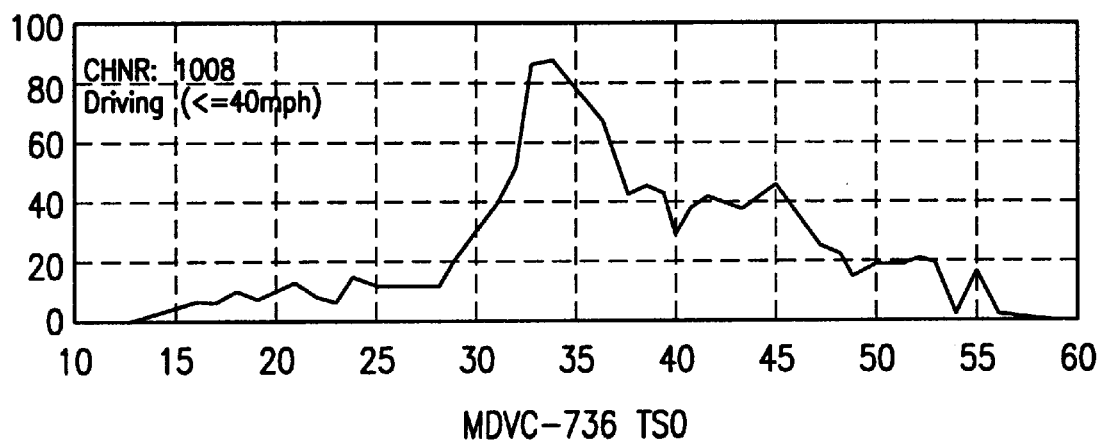

FIGS. 4 and 5 show field measurement results for interference distributions on three time slots for a source placed in a stationary Rician environment (FIG. 3) and for a moving source in a Rayleigh environment (<=40 mph) (FIG. 4). It can be observed that the interference distribution recorded on all of the three time slots is almost identical. Therefore, the interference recorded in an idle time slot can be treated as an approximate representation of interference values in a busy time slot which are tuned to the same carrier. This approximation is accurate enough for most practical applications when the interference moves at a speed of 40 mph or below.

The carrier signal strength and interference values at a particular snapshot are the short-time average values in corresponding time slots and are reported by the BS at sampling intervals. As stated above, if more than one time slot is used for interference measurements, the interference I(n) can be calculated by any of the following equations:

$$I(n) = \begin{cases} \text{maximum}(I_1(n), I_2(n)) \\ \text{average}(I_1(n), I_2(n)) \\ \text{minimum}(I_1(n), I_2(n)) \end{cases}$$

Advantageously, the system and method of the present invention can be applied to any TDMA-based system deployed for outdoor or indoor applications without any major modifications. In addition, this system and method can also be applied to reverse-link C/I lab measurements without major modifications. Furthermore, the system and method of the present invention provides a performance C/I measurement for the cellular network at a system level instead of at a component level (Base Station). Finally, the field environment C/I measurement system and method of the present invention provides a reliable and cost-effective method of reverse C/I measurement which can easily be implemented in any TDMA-based wireless system, including, but not limited to the GSM network, the new Personal Communications System (PCS) network, the D-AMPS network, and the AMPS network.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for obtaining a field measurement of the Carrier-to-Interference ratio on a reverse-link channel over a radio interface, said telecommunications system comprising:

a base station in wireless communication over said radio interface with a mobile station, communication from said mobile station to said base station being sent on said reverse-link channel, said reverse-link channel having a Time Division Multiple Access (TDMA) carrier associated therewith, said TDMA carrier comprising at least two time slots;

carrier measuring means for measuring a carrier level on a first one of said at least two time slots; and interference measuring means for measuring an interference value on at least a second one of said at least two time slots.

2. The telecommunications system of claim 1, wherein said interference measuring means measures a first interference value on said second time slot and at least a second interference value on at least a third one of said at least two time slots, the Carrier-to-Interference ratio being determined by dividing said carrier level by the average of at least said first and second interference values measured on at least said second time slot and said third time slot.

3. The telecommunications system of claim 1, wherein said interference measuring means measures a first interference value on said second time slot and at least a second interference value on at least a third one of said at least two time slots, the Carrier-to-Interference ratio being determined by dividing said carrier level by the maximum of at least said first and second interference values measured on at least said second time slot and said third time slot.

4. The telecommunications system of claim 1, wherein said carrier measuring means comprises a first test tool and said interference measuring means comprises a second test tool.

5. The telecommunications system of claim 4, further comprising a mobile switching center connected to said base station, said first test tool being located within said mobile switching center.

6. The telecommunications system of claim 5, wherein said second test tool is located within said mobile switching center.

7. The telecommunications system of claim 5, wherein said second test tool is connected with said base station.

8. The telecommunications system of claim 4, wherein said first and second test tools are connected with said base station.

9. The telecommunications system of claim 4, wherein said first test tool is said second test tool.

10. The telecommunications system of claim 1, wherein each of said at least two time slots comprise two half-rate time slots, said carrier measuring means measuring said carrier level on said two half-rate time slots of said first time slot, said interference measuring means measuring said interference value on said two half-rate time slots of at least said second time slot.

11. A method for obtaining a field measurement of the Carrier-to-Interference ratio on a reverse-link channel over a radio interface, comprising the steps of:

measuring a carrier level on a first one of at least two time slots of a Time Division Multiple Access (TDMA) carrier associated with said reverse-link channel, communication on said reverse-link channel being sent from a mobile station to a base station, said mobile station being in wireless communication over said radio interface with said base station; and measuring an interference value on at least a second one of said at least two time slots, the Carrier-to-Interference ratio being determined by dividing said carrier level by said interference value.

12. The method of claim 11, wherein said step of measuring said interference value is performed by measuring a first interference value on said second time slot and at least a second interference value on at least a third one of said at least two time slots, the Carrier-to-Interference ratio being determined by dividing said carrier level by the average of at least said first and second interference values measured on at least said second time slot and said third time slot.

13. The method of claim 11, wherein said step of measuring said interference value is performed by measuring a first interference value on said second time slot and at least a second interference value on at least a third one of said at least two time slots, the Carrier-to-Interference ratio being determined by dividing said carrier level by the maximum of at least said first and second interference values measured on at least said second time slot and said third time slot.

14. The method of claim 11, wherein said step of measuring said carrier level is performed using a first test tool and said step of measuring said interference value is performed using a second test tool.

15. The method of claim 14, wherein said first test tool is located within a mobile switching center connected to said base station.

16. The method of claim 15, wherein said second test tool is located within said mobile switching center.

17. The method of claim 15, wherein said second test tool is connected with said base station.

18. The method of claim 14, wherein said first and second test tools are connected with said base station.

19. The method of claim 14, wherein said first test tool is said second test tool.

20. The method of claim 11, wherein each of said at least two time slots comprise two half-rate time slots, said step of measuring said carrier level being performed by measuring said carrier level on said two half-rate time slots of said first time slot, said step of measuring said interference value being performed by measuring said interference value on said two half-rate time slots of at least said second time slot.

* * * * *